United States Patent
Lu et al.

(10) Patent No.: US 9,547,715 B2
(45) Date of Patent: Jan. 17, 2017

(54) METHODS AND APPARATUS FOR DETECTING A REPETITIVE PATTERN IN A SEQUENCE OF AUDIO FRAMES

(75) Inventors: Lie Lu, Beijing (CN); Bin cheng, Beijing (CN)

(73) Assignee: Dolby Laboratories Licensing Corporation, San Francisco, CA (US)

( * ) Notice: Subject to any disclaimer, the term of this patent is extended or adjusted under 35 U.S.C. 154(b) by 742 days.

(21) Appl. No.: 13/564,302

(22) Filed: Aug. 1, 2012

(65) Prior Publication Data

US 2013/0046399 A1 Feb. 21, 2013

Related U.S. Application Data

(60) Provisional application No. 61/540,350, filed on Sep. 28, 2011.

(30) Foreign Application Priority Data

Aug. 19, 2011 (CN) .......................... 2011 1 0243088

(51) Int. Cl.
*G06F 17/30* (2006.01)
*G10L 25/51* (2013.01)
(Continued)

(52) U.S. Cl.
CPC ......... *G06F 17/30743* (2013.01); *G10L 25/03* (2013.01); *G10L 25/45* (2013.01); *G10L 25/51* (2013.01)

(58) Field of Classification Search
CPC ............ G06F 17/30743; G06K 9/0055; G06K 9/00711; G10H 1/00; G10H 1/0008; G10H 1/0025; G10H 2210/051; G10H 2210/056; G10H 2210/061; G10H 2210/066; G10H 2210/076; G10H 2250/135; G10L 15/10; G10L 25/03; G10L 25/48; G10L 25/51; H04H 60/58

(Continued)

(56) References Cited

U.S. PATENT DOCUMENTS 6,225,546 B1   5/2001   Kraft
6,542,869 B1   4/2003   Foote
(Continued)

FOREIGN PATENT DOCUMENTS

CN   101042870   9/2007
EP   2088518     8/2009
(Continued)

OTHER PUBLICATIONS

Daniel Appelt, "Multiresolution Approaches to Audio Structure Analysis—Identifying Hierarchical Structures in Music" University of Bonn: Institute of Computer Science III, Jul. 2008 http://www.audiolabs-erlangen.de/content/05-fau/professor/00-mueller/01-students/2008_AppeltDaniel_MusicStructure_Diplomarbeit.pdf.*
(Continued)

*Primary Examiner* — Paul McCord
*Assistant Examiner* — Alexander Eljaiek

(57) ABSTRACT

Methods and apparatus for detecting a repetitive pattern in a sequence of audio frames are described. Similarity values of a first similarity matrix with first resolution for the sequence are calculated. An adaptive threshold is estimated from the similarity values for classifying the similarity values into repetition or non-repetition. For each of one or more offsets of a second similarity matrix with second resolution higher that the first resolution, similarity values of the second similarity matrix corresponding to the offset are calculated. Then the calculated similarity values are binarized with the adaptive threshold to obtain binarized data.

(Continued)

Finally, the repetitive pattern is detected from the binarized data. The requirement on memory may be reduced because less data are stored in detecting the repetitive pattern.

11 Claims, 3 Drawing Sheets

(51) Int. Cl.
   *G10L 25/03*  (2013.01)
   *G10L 25/45*  (2013.01)

(58) Field of Classification Search
   USPC .............. 84/600, 609, 615, 616; 381/56, 58; 382/173; 700/94; 704/231, 249, 500, 503; 706/20; 707/E17.101
   See application file for complete search history.

(56) References Cited

U.S. PATENT DOCUMENTS

| | | |
|---|---|---|
| 7,304,231 B2 | 12/2007 | van Pinxteren |
| 7,333,864 B1 | 2/2008 | Herley |
| 7,345,233 B2 | 3/2008 | van Pinxteren |
| 7,371,958 B2 | 5/2008 | Kim et al. |
| 2005/0180643 A1* | 8/2005 | Okada .................. H04N 19/127 382/232 |
| 2006/0143421 A1* | 6/2006 | Subramoney ......... G06F 11/348 711/170 |
| 2008/0236371 A1* | 10/2008 | Eronen ................ G10H 1/0008 84/622 |
| 2009/0216354 A1 | 8/2009 | Ong |
| 2010/0082930 A1* | 4/2010 | Jiva ..................... G06F 12/0269 711/166 |

FOREIGN PATENT DOCUMENTS

| | | |
|---|---|---|
| JP | 2006-085090 | 3/2006 |
| KR | 10-2007-0054801 | 5/2007 |
| KR | 10-0725018 | 6/2007 |
| KR | 10-0766170 | 10/2007 |
| KR | 10-2009-0021059 | 2/2009 |
| WO | 02073593 | 9/2002 |
| WO | 2006083550 | 8/2006 |
| WO | 2006086556 | 8/2006 |
| WO | 2007011308 | 1/2007 |
| WO | 2009005735 | 1/2009 |
| WO | 2009013144 | 1/2009 |

OTHER PUBLICATIONS

Lu, Lie, Muyuan Wang, and Hong-Jiang Zhang. "Repeating pattern discovery and structure analysis from acoustic music data." In Proceedings of the 6th ACM SIGMM international workshop on Multimedia information retrieval, pp. 275-282. ACM, 2004.*
Cooper, Matthew L., and Jonathan Foote. "Automatic Music Summarization via Similarity Analysis." In ISMIR. 2002.*
Bartsch, M.A. et al., "To Catch a Chorus: Using Chroma-Based Representations for Audio Thumbnailing", Proc. Int. Workshop on Applications of Signal Processing to Audio and Acoustics, pp. 15-18, 2001, Oct. 21-24, 2001.
Goto, Masataka, "A Chorus-Section Detecting Method for Musical Audio Signals" ICASSP 2003 Proceedings, pp. V-437-V-440, Apr. 2003, IEEE International Conference on Acoustics, Speech and Signal Processing.
Peeters, G. et al., "Toward Automatic Music Audio Summary Generation from Signal Analysis", Proc. Acoustics, Speech, and Signal Processing, 2003.
Cooper, M. et al., "Automatic Music Summarization via Similarity Analysis", Proc. ISMIR 2002, pp. 81-85, 2002.
Chai, Wei "Semantic Segmentation and Summarization of Music", IEEE Signal Processing Magazine, pp. 124-132, 2006.
Lu, L. et al., "Repeating Pattern Discovery and Structure Analysis from Acoustic Music Data" Proc. the 6th ACM SIGMM International Workshop on Multimedia Information Retrieval, Oct. 2004,, pp. 275-282.
Paulus, J. et al., "Music Structure Analysis by Finding Repeated Parts", Proc. 1st ACM Workshop on Audio and Music Computing for Multimedia, pp. 59-68, Oct. 2006.
Steelant, D. et al., "Discovering Structure and Repetition in Musical Audio" Proc. Eurofuse Workshop, 2002.
Chai, W. et al., "Structural Analysis of Musical Signals for Indexing and Thumbnailing" published by IEEE Comput. Soc., Piscataway, NJ, Proceedings 2003 Joint Conference on Digital Libraries, pp. 27-34.
Chai, Wei "Structural Analysis of Musical Signals via Pattern Matching" 2003 IEEE Workshop on Applications of Signal Processing to Audio and Acoustics Oct. 19-22, 2003.
Goto, Masataka, "A Chorus Section Detection Method for Musical Audio Signals and Its Application to a Music Listening Station" IEEE Transactions on Audio, Speech, and Language Processing, vol. 14, No. 5, Sep. 2006.
Shiu, Y et al., "Musical Structure Analysis Using Similarity Matrix and Dynamic Programming" Proc. SPIE 6015, vol. 6015, No. pp. 398-409, Oct. 2005.
Paulus J. et al., "Music Structure Analysis by Finding Repeated Parts" AMCMM 2006, pp. 59-68, New York, NY.
Foote, J. et al., "Media Segmentation Using Self-Similarity Decomposition" Proc. SPIE 5021, Storage and Retrieval for Media Databases 2003, 167, Jan. 20, 2003, vol. 5021.
Wellhausen, J. et al., "Audio Thumbnailing Using MPEG-7 Low-Level Audio Descriptors" Proc. of the SPIE—The International Society for Optical Engineering, vol. 5242, No. 1, pp. 65-73, published in 2003.
Hsu, Jia-Lien, et al. "Efficient Repeating Pattern Finding in Music Databases" Proc. of the 1998 ACM CIKM International Conference on Information and Knowledge Management, Inclusive pp. 281-288.
Wang, L. et al., "Efficient Sparse Self-Similarity Matrix Construction for Repeating Sequence Detection" Proc. 2009 IEEE International Conference on Multimedia and Expo, published in 2009.
Wang, M. et al "Repeating Pattern Discovery from Acoustic Musical Signals" IEEE International Conference on Multimedia and Expo, Jun. 27-30, 2004, vol. 3, pp. 2019-2022.

* cited by examiner

METHODS AND APPARATUS FOR DETECTING A REPETITIVE PATTERN IN A SEQUENCE OF AUDIO FRAMES

CROSS REFERENCE TO RELATED APPLICATIONS

This Application claims the benefit of priority to related, Chinese Patent Application number 201110243088.6 filed on 19 Aug. 2011 and U.S. Patent Application No. 61/540,350 filed on 28 Sep. 2011 entitled "Methods and Apparatus for Detecting a Repetitive Pattern in a Sequence of Audio Frames" by Lu, Lie et al. hereby incorporated by reference in its entirety.

TECHNICAL FIELD

The present invention relates generally to audio signal processing. More specifically, embodiments of the present invention relate to methods and apparatus for detecting a repetitive pattern in a sequence of audio frames.

BACKGROUND

Audio signals, especially music signals, usually show repetitive characteristics: an audio section will be repeated later in the audio signal. Detecting these repetitive sections in an audio signal has gained much attention, since it is a fundamental step and can be used in various applications, such as music detection, music chorus detection, music thumbnailing or summarization, and music structure analysis.

With regard to the term repetitive section, different terms with similar meaning may be used in different literatures, such as recurrent, repetition, repetitive pattern, or repeating pattern. These terms may be used interchangeably in this disclosure without any confusion.

To detect the repetitive sections, approaches can involve computing a similarity (or distance) matrix, and finding the repetitive patterns in this matrix. The similarity matrix includes similarity values s(t, l) between frames t and t+l where l represents the offset of similarity values s(t, l). A general idea is to estimate a fixed threshold, and use it to binarize the matrix. That is, each pixel in the similarity matrix is binarized to 1 if its similarity value is larger than the fixed threshold, indicating it represents a repetition; and otherwise the pixel is set to 0. After binarization, repetitive patterns can be easily found by detecting the lines containing continuous 1 in each offset. (See M. Goto. "A chorus-section detecting method for musical audio signals," Proc. Acoustics, Speech, and Signal Processing, 2003, which is herein incorporated by reference for all purposes)

The approaches described in this section are approaches that could be pursued, but not necessarily approaches that have been previously conceived or pursued. Therefore, unless otherwise indicated, it should not be assumed that any of the approaches described in this section qualify as prior art merely by virtue of their inclusion in this section. Similarly, issues identified with respect to one or more approaches should not assume to have been recognized in any prior art on the basis of this section, unless otherwise indicated.

SUMMARY

According to an embodiment of the invention, a method of detecting a repetitive pattern in a sequence of audio frames is provided. According to the method, similarity values of a first similarity matrix with first resolution for the sequence are calculated. An adaptive threshold is estimated from the similarity values for classifying the similarity values into repetition or non-repetition. For each of one or more offsets of a second similarity matrix with second resolution higher than the first resolution, similarity values of the second similarity matrix corresponding to the offset are calculated. The calculated similarity values are binarized with the adaptive threshold to obtain binarized data. The repetitive pattern is detected from the binarized data.

According to another embodiment of the invention, an apparatus for detecting a repetitive pattern in a sequence of audio frames is provided. The apparatus includes a calculator, an estimator and a detector. The calculator calculates similarity values of a first similarity matrix with first resolution for the sequence. The estimator estimates an adaptive threshold from the similarity values for classifying the similarity values into repetition or non-repetition. For each of one or more offsets of a second similarity matrix with second resolution higher than the first resolution, the detector calculates similarity values of the second similarity matrix corresponding to the offset, classifies the calculated similarity values with the adaptive threshold to obtain binarized data, and detects the repetitive pattern from the binarized data.

According to another embodiment of the invention, a computer-readable medium having computer program instructions recorded thereon is provided. When being executed by a processor, the instructions enable the processor to perform a method of detecting a repetitive pattern in a sequence of audio frames. According to the method, similarity values of a first similarity matrix with first resolution for the sequence are calculated. An adaptive threshold is estimated from the similarity values for classifying the similarity values into repetition or non-repetition. For each of one or more offsets of a second similarity matrix with second resolution higher than the first resolution, similarity values of the second similarity matrix corresponding to the offset are calculated. The calculated similarity values are binarized with the adaptive threshold to obtain binarized data. The repetitive pattern is detected from the binarized data.

According to another embodiment of the invention, a method of detecting a repetitive pattern in a sequence of audio frames is provided. Similarity values of a first similarity matrix for the sequence are calculated. For each of the offsets of the first similarity matrix, a significant score for evaluating the possibility of detecting the repetitive pattern corresponding to the offset is calculated based on the calculated similarity values of the first similarity matrix corresponding to the offset. The significant score is compared with a threshold associated the offset. If the significant score is greater than the threshold, the offset is determined as a significant offset. The similarity values of the first similarity matrix corresponding to the significant offsets are stored in a buffer. An adaptive threshold is estimated from the similarity values for classifying the similarity values into repetition or non-repetition. For a second similarity matrix with the same resolution as the first similarity matrix, the similarity values of the first similarity matrix corresponding to the significant offsets are read from the buffer, as the similarity values of the second similarity matrix. The read similarity values are classified with the adaptive threshold to obtain binarized data. The repetitive pattern is detected from the binarized data.

According to another embodiment of the invention, an apparatus for detecting a repetitive pattern in a sequence of audio frames is provided. The apparatus includes a calculator, an estimator and a detector. The calculator calculates similarity values of a first similarity matrix for the sequence. For each of the offsets of the first similarity matrix, the calculator calculates a significant score for evaluating the possibility of detecting the repetitive pattern corresponding to the offset based on the calculated similarity values of the first similarity matrix corresponding to the offset. The calculator also compares the significant score with a threshold associated the offset. If the significant score is greater than the threshold, the calculator determines the offset as a significant offset. The calculator also stores the similarity values of the first similarity matrix corresponding to the significant offsets in a buffer. The estimator estimates an adaptive threshold from the similarity values for classifying the similarity values into repetition or non-repetition. For a second similarity matrix with the same resolution as the first similarity matrix, the detector reads the similarity values of the first similarity matrix corresponding to the significant offsets from the buffer as the similarity values of the second similarity matrix to be calculated. The detector classifies the read similarity values with the adaptive threshold to obtain binarized data, and detects the repetitive pattern from the binarized data.

Further features and advantages of the invention, as well as the structure and operation of various embodiments of the invention, are described in detail below with reference to the accompanying drawings. It is noted that the invention is not limited to the specific embodiments described herein. Such embodiments are presented herein for illustrative purposes only. Additional embodiments will be apparent to persons skilled in the relevant art(s) based on the teachings contained herein.

BRIEF DESCRIPTION OF DRAWINGS

The present invention is illustrated by way of examples, and not by way of limitation, in the figures of the accompanying drawings and in which like reference numerals refer to similar elements and in which.

DETAILED DESCRIPTION

Figure 1:
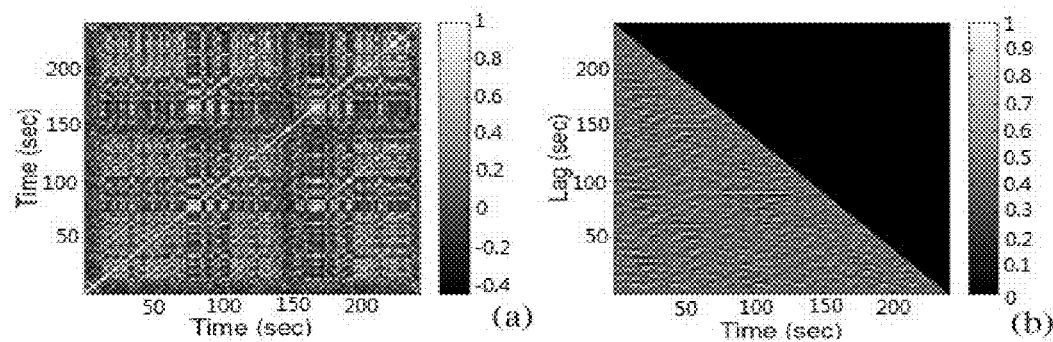
FIG. 1(a) illustrates an example of the similarity matrix.
FIG. 1(b) illustrates an example of the time-lag similarity matrix converted from the matrix shown in FIG. 1(a)

The embodiments of the present invention are below described by referring to the drawings. It is to be noted that, for purpose of clarity, representations and descriptions about those components and processes known by those skilled in the art but unrelated to the present invention are omitted in the drawings and the description.

As will be appreciated by one skilled in the art, aspects of the present invention may be embodied as a system (e.g., an online digital media store, cloud computing service, streaming media service, telecommunication network, or the like), device (e.g., a cellular telephone, portable media player, personal computer, television set-top box, or digital video recorder, or any media player), method or computer program product. Accordingly, aspects of the present invention may take the form of an entirely hardware embodiment, an entirely software embodiment (including firmware, resident software, microcode, etc.) or an embodiment combining software and hardware aspects that may all generally be referred to herein as a "circuit," "module" or "system." Furthermore, aspects of the present invention may take the form of a computer program product embodied in one or more computer readable medium(s) having computer readable program code embodied thereon.

Any combination of one or more computer readable medium(s) may be utilized. The computer readable medium may be a computer readable signal medium or a computer readable storage medium. A computer readable storage medium may be, for example, but not limited to, an electronic, magnetic, optical, electromagnetic, infrared, or semiconductor system, apparatus, or device, or any suitable combination of the foregoing. More specific examples (a non-exhaustive list) of the computer readable storage medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the context of this document, a computer readable storage medium may be any tangible medium that can contain, or store a program for use by or in connection with an instruction execution system, apparatus, or device.

A computer readable signal medium may include a propagated data signal with computer readable program code embodied therein, for example, in baseband or as part of a carrier wave. Such a propagated signal may take any of a variety of forms, including, but not limited to, electromagnetic, optical, or any suitable combination thereof.

A computer readable signal medium may be any computer readable medium that is not a computer readable storage medium and that can communicate, propagate, or transport a program for use by or in connection with an instruction execution system, apparatus, or device.

Program code embodied on a computer readable medium may be transmitted using any appropriate medium, including but not limited to wireless, wired line, optical fiber cable, RF, etc., or any suitable combination of the foregoing.

Computer program code for carrying out operations for aspects of the present invention may be written in any combination of one or more programming languages, including an object oriented programming language such as Java, Smalltalk, C++ or the like and conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

Aspects of the present invention are described below with reference to flowchart illustrations and/or block diagrams of methods, apparatus (systems) and computer program products according to embodiments of the invention. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer readable medium that can direct a computer, other programmable data processing apparatus, or other devices to function in a particular manner, such that the instructions stored in the computer readable medium produce an article of manufacture including instructions which implement the function/act specified in the flowchart and/or block diagram block or blocks.

The computer program instructions may also be loaded onto a computer, other programmable data processing apparatus (e.g., a cellular telephone, portable media player, personal computer, television set-top box, or digital video recorder, or any media player), or other devices to cause a series of operational steps to be performed on the computer, other programmable apparatus or other devices to produce a computer implemented process such that the instructions which execute on the computer or other programmable apparatus provide processes for implementing the functions/acts specified in the flowchart and/or block diagram block or blocks.

A similarity matrix representing self-similarity of an audio signal may be calculated by dividing the audio signal into multiple frames and measuring the similarity between every two frames. For example, FIG. 1(a) illustrates an example of the similarity matrix, where the pixel value of each pixel ($t_i$, $t_j$) represents the similarity between frames $t_i$ and $t_j$. The more similar the two frames are, the whiter the pixel is in this depiction. It can be clearly seen that each distinctive line parallel to the diagonal of the matrix represents a repetitive pattern. Since the similarity matrix and distance matrix is simply equivalent, in the following sections, we take only the similarity matrix as an example.

For easy processing in the subsequent steps, the similarity matrix is usually represented in form of a time-lag similarity matrix, where the horizontal axis (temporal axis) represents a temporal timestamp (or frame) t and the vertical axis (offset axis) is a time offset (or lag) l. That is, the pixel value of each pixel (t, l) in the time-lag matrix is the similarity value between time (or frame) t and t+l. A repetitive pattern becomes a horizontal line in the matrix. FIG. 1(b) illustrates an example of the time-lag similarity matrix converted from the matrix shown in FIG. 1(a).

As illustrated in FIG. 1, the similarity matrix is usually an N×N matrix, where N is the number of frames in the audio signal. For example, for a 5-minute audio signal that is divided into frames by a 100-millisecond non-overlapping window, there are 3000 frames in the audio signal, and the size of the similarity matrix can be 3000×3000/2=4.5M (considering it is symmetric). In case of storing each value in the similarity matrix by 2-4 bytes, the entire size of the similarity matrix is 9-18 MB (Mega Bytes).

In applications such as embedded systems where the memory capacity is limited, this memory cost is not affordable. For example, typical memory cost of applications in embedded systems is around 100 KB or less. To make the algorithm feasible in embedded systems, approaches are needed to greatly reduce the memory cost without compromising the accuracy on repetitive pattern detection.

Estimating Adaptive Threshold through Coarse-Resolution Similarity Matrix

In general, an entire similarity matrix is calculated and stored to estimate an adaptive threshold by exploiting the global distribution of the similarity values in the similarity matrix. Specifically, statistics such as mean and probability, and percentile are calculated from similarity values in the similarity matrix and the adaptive threshold is estimated from the statistics.

If a similarity matrix has resolution lower than one-frame resolution in one or more of offset axis and temporal axis, the similarity matrix is referred to as a similarity matrix with coarse-resolution (also called coarse-resolution similarity matrix). A similarity matrix with one-frame resolution both in offset axis and temporal axis is referred to as is referred to as a similarity matrix with high-resolution (also called as high-resolution similarity matrix). While less samples are included in a coarse-resolution similarity matrix in comparison with a high-resolution similarity matrix, the dynamic range and the statistics of the similarity values in the coarse-resolution similarity matrix are similar to those in the high-resolution similarity matrix. Therefore, it is possible to estimate the adaptive threshold from a coarse-resolution similarity matrix. Thus obtained adaptive threshold can be close to that obtained from a high-resolution similarity matrix.

Instead of directly detecting repeating patterns on this coarse-resolution similarity matrix, another similarity matrix with resolution higher than that of the coarse-resolution similarity matrix is used in repeating pattern detection to guarantee high accuracy. The resolution higher than the coarse resolution refers to a resolution which is not lower than the coarse resolution in both offset axis and temporal axis, and is higher than the coarse resolution in at least one of the offset axis and the temporal axis. In the similarity matrix with the higher resolution, similarity values corresponding to every offset of the similarity matrix (that is, one row of the time-lag similarity matrix with the higher resolution) can be obtained. For each offset, the estimated adaptive threshold is used to binarize the obtained similarity values to detect a repetitive pattern in the offset. In this way, only a coarse-resolution similarity matrix and one row of the similarity values need to be stored, reducing the memory cost in comparison with storing the high-resolution similarity matrix and detecting the repetitive pattern therefrom.

Figure 2:
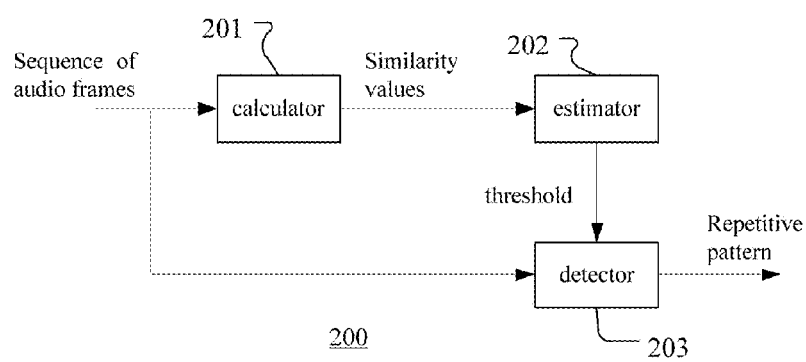
FIG. 2 is a block diagram illustrating an example apparatus for detecting a repetitive pattern in a sequence of audio frames according to an embodiment of the present invention.

FIG. 2 is a block diagram illustrating an example apparatus 200 for detecting a repetitive pattern in a sequence of audio frames according to an embodiment of the present invention.

As illustrated in FIG. 2, apparatus 200 includes a calculator 201, an estimator 202 and a detector 203.

Calculator 201 calculates similarity values s(t, l) of a similarity matrix $M_1$ with coarse-resolution for the sequence.

Coarse Resolution

The sequence includes a number of audio frames. The audio frames include audio samples. Offsets of the similarity matrix are measured in units of audio frame. A similarity matrix $M_2$ has resolution higher than that of the similarity matrix $M_1$ in offset axis or/and temporal axis.

In a first example, in comparison with the similarity matrix $M_2$, the similarity matrix $M_1$ may have a lower resolution than the similarity matrix $M_2$ in the temporal axis. In this case, the similarity matrix $M_1$ may have one-segment resolution, and one segment includes at least two audio frames. In the following, a segment starting at audio frames t is referred to as segment t. Each segment is a sequence of audio frames, and therefore, various methods for calculating similarity values between sequences of audio frames may be adopted to calculate the similarity values between the segments.

As an example of calculating similarity value s(t, l) between segments t and t+l, l>0, it is possible to calculate similarity values $s_h$(t+i, l) between audio frames t+i of the segment t and audio frames t+l+i of the segment t+l, 0≤i≤W−1, where W (e.g., W=10) is the length of the segments in units of audio frame. The similarity values $s_h$(t+i, l) may be averaged as the similarity value s(t, l). For example, the similarity value s(t, l) may be calculated as $$s(t, l) = \sum_{i=0}^{W-1} w(i) s_h(t+i, l) \qquad (1)$$

where w(i) is the corresponding weighting factor which can be a uniform distribution, Gaussian, triangle, or other kind of functions.

As an example of calculating similarity value s(t, l) between segments t and t+l, l>0, it is possible to obtain a number N of subsamples $t_i$ from frames t, ..., t+W−1 of the segment t and the number N of subsamples $t_i$+l from frames t+l, ..., t+l+W−1 of the segment t+l, that is, $t_i$=g(i), where g( ) is a sub-sampling function. An example is g(i)=t+i×W/N, 0≤i≤N−1. Alternatively, g( ) may also be a nonlinear sub-sampling function. In this case, it is possible to calculate similarity values $s_h$($t_i$, l) between audio frames $t_i$ of the segment t and $t_i$+l of the segment t+l, 0≤i≤N−1. The similarity values $s_h$($t_i$, l) may be averaged as the similarity value s(t, l). For example, the similarity value s(t, l) may be calculated as $$s(t, l) = \sum_{i=0}^{N-1} w(i) s_h(t_i, l) \qquad (2)$$

where w(i) is the corresponding weighting factor which can be a uniform distribution, Gaussian, triangle, or other kind of functions.

In a second example, in comparison with the similarity matrix $M_2$, the similarity matrix $M_1$ may have a lower resolution than the similarity matrix $M_2$ in the offset axis. In this case, the offsets of the similarity matrix $M_1$ may be not consecutive in units of frame. In other words, the offsets of the similarity matrix $M_1$ may be determined by removing one or more offsets from a set O={1, ..., L}, where L is the length of the sequence in units of frame.

For example, offsets $l_i$ of the similarity matrix $M_1$ may be subsamples from the set O, that is, $l_i$=g(i), where g( ) can be a sub-sampling function, e.g. g(i)=n×i, to linearly pick up one frame per n frames. Alternatively, g( ) may also be a nonlinear sub-sampling function. In this case, the similarity values s(t, $l_i$) may be calculated with the methods described in connection with the first example. Alternatively, for the similarity value s(t, $l_i$) between two segments t and t+$l_i$, it is possible to calculate similarity values s(t, $t_j$) between two segments t and t+$t_j$, where $t_j$ represents each (high-resolution) offset in the range from to $l_i$−m to $l_i$+n, m, n≥0 and m+n≠0, and average the similarity values s(t, $t_j$), $l_i$−m≤$t_j$≤$l_i$+n as the similarity value $s_a$(t, $l_i$). For example, the similarity value $s_a$(t, $l_i$) may be calculated as $$s_a(t, l_i) = \sum_{i=0}^{m+n-1} w(i) s(t, t_j) \qquad (3)$$

where w(i) is the corresponding weighting factor which can be a uniform distribution, Gaussian, triangle, or other kind of functions.

In a third example, in comparison with the similarity matrix $M_2$, the similarity matrix $M_1$ may have lower resolution than the matrix $M_2$ in both offset axis and temporal axis. In this case, the similarity values s(t, l) may be calculated with the methods described in connection with the first and second examples.

Estimating Adaptive Threshold

Estimator 202 estimates an adaptive threshold from the similarity values for classifying the similarity values into repetition or non-repetition. Various methods for estimating the adaptive threshold from a high-resolution similarity matrix may also be adopted to estimate the adaptive threshold from the coarse-resolution similarity matrix.

Further, because the adaptive threshold is usually estimated from the statistics such as mean and probability (of the repetition or non-repetition), and percentile of the similarity values in the similarity matrix, it is possible to store the statistics instead of the similarity matrix, in order to reduce the memory cost.

In a fourth example, the RefraiD method extracts a 12-dimensional feature vector called a chroma vector, which is robust for small changes of accompaniments, from each frame of an input audio signal and calculates the similarity between these vectors. Each element of the chroma vector corresponds to one of the 12 pitch classes and is the sum of power at frequencies of its pitch class over six octaves.

In an example, calculator 201 may be configured to, upon calculating each of the similarity values of the coarse-resolution similarity matrix $M_1$, update statistics of the similarity values for estimating the adaptive threshold. Accordingly, estimator 202 may be configured to estimate the adaptive threshold based on the statistics.

As an example, the statistics may comprise a histogram for accumulating the number of the similarity values falling in each of similarity value bins. In this case, the histogram comprises a number of similarity value bins in the range between a minimum value and a maximum value. For each similarity value bin, the number of the similarity values located within each similarity value bin is accumulated and/or finally normalized after going through all the similarity values in the similarity matrix. The histogram may be updated upon calculating a similarity value.

Because the statistics for estimating the adaptive threshold can be obtained from the histogram, various methods of estimating the adaptive threshold from the statistics may also be applied in case of histogram. For example, it is possible to find the percentile position because the histogram is essentially a probability distribution, and the mean may be approximated by the following equation to compute the statistics:

$$\mu = \frac{1}{N}\sum_{i=1}^{N} x(i) \approx \sum_{i=b_l}^{b_h} h(i)p(i) / \sum_{i=b_l}^{b_h} p(i) \quad (4)$$

where h(i) is the representative value of i-th bin and the p(i) is the corresponding probability, $b_l$ and $b_h$ are the lower-bound and upper-bound of the bins to be investigated. Then the adaptive threshold may be obtained by maximizing the following between-class variance:

$$\sigma_B^2 = w_1 w_2 (\mu_1 - \mu_2)^2 \quad (5)$$

where one class represents the pixels to be binarized to 1 and the other class contains those to be set to 0, $w_1$ and $w_2$, and $u_1$ and $u_2$ are the probabilities and the mean of each class.

Detecting Repetitive Pattern

With the estimated adaptive threshold, the repetitive pattern may be detected from the similarity matrix $M_2$ in an offset basis. In this case, for each l of one or more offsets of the similarity matrix $M_2$, detector 203 calculates similarity values s(t, l) of the similarity matrix $M_2$ corresponding to the offset l, classifies the calculated similarity values s(t, l) with the adaptive threshold to obtain binarized data, and detects the repetitive pattern from the binarized data. Therefore, it is not necessary to store all the similarity values of the similarity matrix $M_2$.

The similarity matrix $M_2$ may also be a coarse-resolution similarity matrix. In this case, the similarity values of the similarity matrix $M_2$ may be calculated with the same method as that for calculating the similarity values of the similarity matrix $M_1$.

In case that the coarse-resolution similarity matrix $M_1$ has the same resolution as the similarity matrix $M_2$ on the temporal axis, similarity values of the similarity matrix $M_2$ corresponding to some offsets have been calculated during calculating the similarity values of the coarse-resolution similarity matrix $M_1$. If there is available memory capacity, some or all of the calculated similarity values of the coarse-resolution similarity matrix $M_1$ may be stored for use in detecting the repetitive pattern.

In a further embodiment of apparatus 200, apparatus 200 may include a buffer (not illustrated in FIG. 2). Accordingly, calculator 201 may be configured to store the similarity values of the coarse-resolution similarity matrix $M_1$ corresponding to at least one portion of the offsets of the coarse-resolution similarity matrix $M_1$ in the buffer. When the similarity values of the similarity matrix $M_2$ corresponding to an offset are to be calculated, detector 203 may be configured to determine whether the similarity values of the coarse-resolution similarity matrix $M_1$ corresponding to the offset are stored in the buffer. If the similarity values of the coarse-resolution similarity matrix $M_1$ corresponding to the offset are stored in the buffer, detector 203 read the similarity values of the coarse-resolution similarity matrix $M_1$ corresponding to the offset from the buffer as the similarity values of the similarity matrix $M_2$ to be calculated. The detector 203 detects the repetitive pattern from the read similarity values.

According to the embodiments, for a sequence including N audio frames, because the adaptive threshold is estimated based on similarity values of a coarse-resolution similarity matrix, the number of the similarity values that have to be stored before estimating the adaptive threshold is smaller in comparison with the case of a high-resolution (N×N) similarity matrix. Because the adaptive threshold has been estimated, in detecting the repetitive pattern, the memory capacity for storing the similarity values of the coarse-resolution similarity matrix can be released. With the estimated adaptive threshold, it is possible to store only the similarity values corresponding to one offset of a similarity matrix and detect the repetitive pattern from the stored similarity values in an offset-by-offset manner. Therefore, the memory cost may be reduced.

Further Improvements

Because the repetitive pattern is detected from the similarity values of the similarity matrix $M_2$ corresponding to an offset (also called a row corresponding to the offset), it is possible to evaluate the possibility of detecting a repetitive pattern from the similarity values based on the criteria for detecting the repetitive pattern. For example, if most of the similarity values in a row are higher, there is a higher possibility of detecting a repetitive pattern from the row. For another example, if the similarity values within a window in a row are higher, there is a higher possibility of detecting a repetitive pattern of a predetermined length from the row. In the following, the offset of the row having higher possibility of detecting the repetitive pattern therefrom is called as a significant offset. The possibility of a row may be evaluated by a significant score. The significant score may be calculated based on the criteria for detecting the repetitive pattern.

In a further embodiment of apparatus 200, for each l of the offsets of the coarse-resolution similarity matrix $M_1$, calculator 201 may be further configured to calculate the significant score sig(l) for evaluating the possibility of detecting the repetitive pattern corresponding to the offset l based on the calculated similarity values s(t, l) of the coarse-resolution similarity matrix $M_1$ corresponding to the offset l. Calculator 201 then compares the significant score sig(l) with a threshold TH(l) associated the offset l. If the significant score sig(l) is greater than the threshold TH(l), calculator 201 determine the offset l as a significant offset.

If an offset l is determined as significant, detector 203 calculates the similarity values of the similarity matrix $M_2$ corresponding to offsets falling within a range around the offset l, and detects the repetitive pattern from the similarity values. In other words, the significant offset and its neighboring offsets are included in the offsets to be detected by detector 203. If an offset is not determined as significant or does not fall within such range, detector 203 may ignore the offset in the detection. Accordingly, it is possible to reduce the calculation cost of detector 203. The length of the range and position of the offset l in the range may be predefined, or may be learned from statistics. In this way, only similarity values corresponding to the significant offsets are calculated for detecting the repetitive pattern. Therefore, the calculation cost may be reduced.

Additionally or alternatively, in case that the coarse-resolution similarity matrix $M_1$ has the same resolution as the similarity matrix $M_2$ on the temporal axis, if an offset is determined as significant, calculator 201 may store the similarity values corresponding to the offset in the buffer, so that detector 203 may avoid re-calculate the similarity values corresponding to the offset and reuse the similarity values corresponding to the offset stored in the buffer. This can also reduce the calculation cost of detector 203. Further, only similarity values corresponding to significant offsets are stored for estimating the adaptive threshold. Therefore, the memory cost may be further reduced.

In a variant of these methods incorporating the significant offsets, the similarity matrices $M_1$ and $M_2$ may have the same resolution, including the high resolution. In this case, the adaptive threshold and the significant offsets are determined based on the similarity matrix $M_1$, and the repetitive pattern is detected based on the adaptive threshold and the significant offsets from the similarity matrix $M_2$.

In an example of calculating the significant score sig(l) for the similarity values corresponding to an offset l, it is possible to calculate the significant score as the maximal average in a moving window over the calculated similarity values of a similarity matrix corresponding to the offset l $$sig(l) = \max_t \frac{1}{W} \sum_{i=1}^{W} s(t+i, l) \quad (6)$$

where W is the window length and can be set based on applications. Suppose only the repetitions that are longer than 10 s are required, W can be set to the number of frames corresponding to 10 seconds. In this case, the calculated similarity values $s(t_i, l)$ are arranged as a row of a corresponding time-lag similarity matrix, that is, are arranged in order of minimal starting time $t_i$ of the frames $t_i$ and $t_i+l$ or calculating the similarity values $s(t_i, l)$.

In another example of calculating the significant score sig(l) for the similarity values corresponding to an offset l, it is possible to calculate an average of the calculated similarity values of a similarity matrix corresponding to the offset as the significant score sig(l).

The threshold TH(l) may be pre-defined, fixed, or adaptively calculated for each offset based on the similarity values. In case of adaptively calculating, calculator 201 may be further configured to calculate the threshold TH(l) associated with the offset 1 as an average of the calculated significant scores corresponding to a predetermined number of the offsets around the offset. For example, the threshold TH(l) may be calculated as $$Th(l) = \sum_{t=l-k_1}^{l+k_2} w(t) sig(t)$$

where w(t) is a weighting function that can be usually set to $1/(k_1+k_2+1)$, $0 \leq k_1 \leq l$, $0 \leq k \leq k_2$, and $k_1+k_2 \neq 0$. In a special case, $k_1 = l-1$ and $k_2 = 0$.

In some cases where online computing is required, only the significant score at one side may be available. In other words, the similarity values of the coarse-resolution similarity matrix are calculated in descending or ascending order of the offsets. In this case, calculator 201 may be further configured to determine a threshold TH'(l) associated with the offset l as the maximum of a predetermined number Q of the previously calculated significant scores, e.g., sig(l-1), .sig(l-Q) in case of the ascending order. If sig(l)>TH'(l), then the offset l is determined as significant. Alternatively, in this case, calculator 201 may be further configured to determine the offset l as significant if sig(l)>TH(l) and sig(l)>TH'(1).

The above threshold-based constraints on significant offset may be combined with one or more of the following refinements.

Refinement 1—It is possible to refine the result based on a local peak criterion. In this case, calculator 201 may be further configured to re-determine any significant offset having the significant score smaller than that of its neighboring offsets as non-significant.

Refinement 2—Calculator 201 may be further configured to re-determine the offset within a predetermined range around any expected significant offset is as a significant offset. In other words, the offsets l, $l_{min} \leq l \leq l_{max}$ are determined as significant, where $l_{min}$ and $l_{max}$ is the lower bound and upper bound of the expected range around the significant offset ls.

Figure 3:
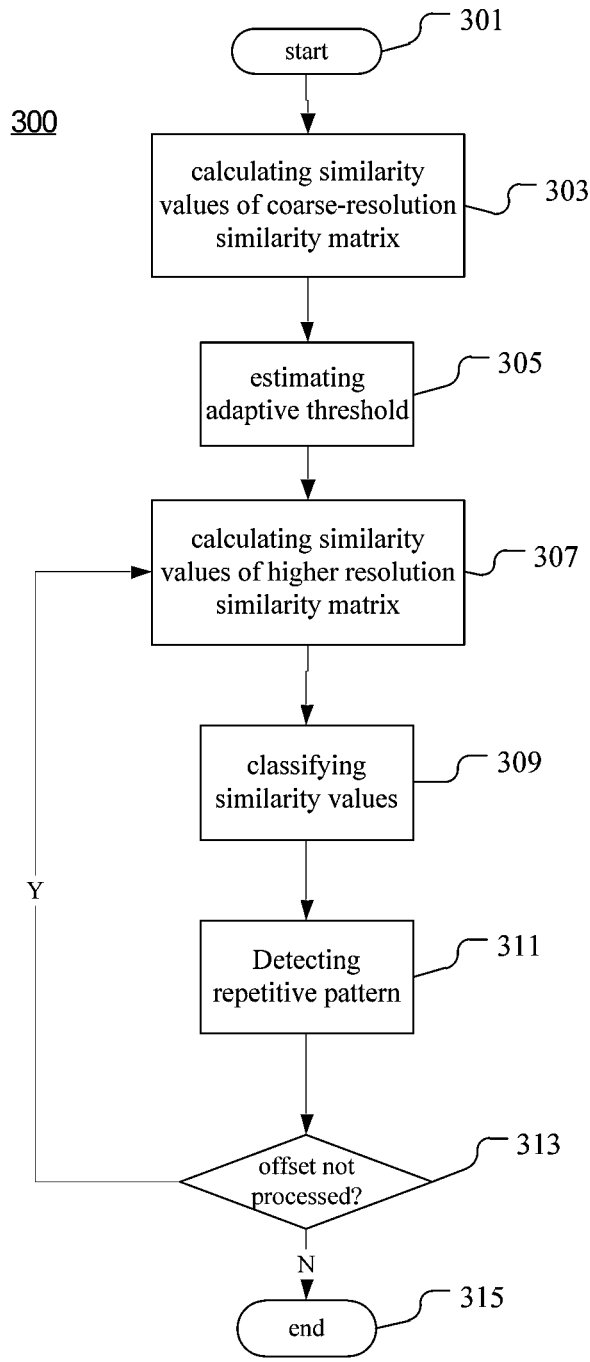
FIG. 3 is a flow chart illustrating an example method of detecting a repetitive pattern in a sequence of audio frames according to an embodiment of the present invention.

FIG. 3 is a flow chart illustrating an example method 300 of detecting a repetitive pattern in a sequence of audio frames according to an embodiment of the present invention.

As illustrated in FIG. 3, method 300 starts from step 301.

At step 303, similarity values s(t, l) of a similarity matrix $M_1$ with coarse-resolution for the sequence are calculated.

In an example, in comparison with the similarity matrix $M_2$, the similarity matrix $M_1$ may have a lower resolution than the similarity matrix $M_2$ in the temporal axis. In this case, the similarity matrix $M_1$ may have one-segment resolution, and one segment includes at least two audio frames.

As an example of calculating similarity value s(t, l) between segments t and t+l, l>0, it is possible to calculate similarity values $s_h(t+i, l)$ between audio frames t+i of the segment t and audio frames t+l+i of the segment t+l, $0 \leq i \leq W-1$, where W (e.g., W=10) is the length of the segments in units of audio frame. The similarity values $s_h(t+i, l)$ may be averaged as the similarity value s(t, l). For example, the similarity value s(t, l) may be calculated by Eq. (1).

As an example of calculating similarity value s(t, l) between segments t and t+l, l>0, it is possible to obtain a number N of subsamples $t_i$ from frames t, ..., t+W-1 of the segment t and the number N of subsamples $t_i+l$ from frames t+l, ..., t+l+W-1 of the segment t+l, that is, $t_i=g(i)$, where g( ) is a sub-sampling function. An example is $g(i)=t+i \times W/N$, $0 \leq i \leq N-1$. Alternatively, g( ) may also be a nonlinear sub-sampling function. In this case, it is possible to calculate similarity values $s_h(t, l)$ between audio frames $t_i$ of the segment t and $t_i+l$ of the segment t+l, $0 \leq i \leq N-1$. The similarity values $s_h(t, l)$ may be averaged as the similarity value s(t, l). For example, the similarity value s(t, l) may be calculated by Eq.(2).

In another example, in comparison with the similarity matrix $M_2$, the similarity matrix $M_1$ may have a lower resolution than the similarity matrix $M_2$ in the offset axis. In this case, the offsets of the similarity matrix $M_1$ may be not consecutive in units of frame. In other words, the offsets of the similarity matrix $M_1$ may be determined by removing one or more offsets from a set O={1, ..., L}, where L is the length of the sequence in units of frame.

For example, offsets $l_i$ of the similarity matrix $M_1$ may be subsamples from the set O, that is, $l_i=g(i)$, where g( ) can be a sub-sampling function, e.g. $g(i)=n \times i$, to linearly pick up one frame per n frames. Alternatively, g( ) may also be a nonlinear sub-sampling function. In this case, the similarity values $s(t, l_i)$ may be calculated with the methods described in connection with the first example. Alternatively, for the similarity value $s(t, l_i)$ between two segments t and $t+l_i$, it is possible to calculate similarity values $s(t, t_j)$ between two segments t and $t+t_j$, where $t_j$ represents each (high-resolution) offset in the range from to $l_i-m$ to $l_i+n$, m, n≥0 and m+n≠0, and average the similarity values $s(t, t_j)$, $l_i-m \leq t_j \leq l_i+n$ as the similarity value $s_a(t, l_i)$. For example, the similarity value $s_a(t, l_i)$ may be calculated by Eq.(3).

In another example, in comparison with the similarity matrix $M_2$, the similarity matrix $M_1$ may have lower resolution than the matrix $M_2$ in both offset axis and temporal axis. In this case, the similarity values s(t, l) may be calculated with the methods described in connection with the first and second examples.

At step 305, an adaptive threshold is estimated from the similarity values for classifying the similarity values into repetition or non-repetition. Various methods may be adopted to estimate the adaptive threshold from the coarse-resolution similarity matrix.

In an example, it is possible to update statistics of the similarity values for estimating the adaptive threshold upon calculating each of the similarity values of the coarse-resolution similarity matrix $M_1$ at step 303. Accordingly, at step 305, the adaptive threshold is estimated based on the statistics.

As an example, the statistics may comprise a histogram for accumulating the number of the similarity values falling in each of similarity value bins. Because the statistics for estimating the adaptive threshold can be obtained from the histogram, various methods of estimating the adaptive threshold from the statistics may also be applied in case of histogram.

At step 307, for an offset l of one or more offsets of the similarity matrix $M_2$, similarity values $s(t, l)$ of the similarity matrix $M_2$ corresponding to the offset l is calculated.

At step 309, the calculated similarity values $s(t, l)$ are classified with the adaptive threshold to obtain binarized data.

At step 311, a repetitive pattern is detected from the binarized data.

The similarity matrix $M_2$ may also be a coarse-resolution similarity matrix. In this case, the similarity values of the similarity matrix $M_2$ may be calculated with the same method as that for calculating the similarity values of the similarity matrix $M_1$.

At step 313, it is determined whether there is another offset not processed yet. If yes, method 300 returns to 307 to calculate similarity values of the similarity matrix $M_2$ corresponding to the other offset not processed yet. If no, method 300 ends at step 315.

In a further embodiment of method 300, step 303 may comprise storing the similarity values of the coarse-resolution similarity matrix $M_1$ corresponding to at least one portion of the offsets of the coarse-resolution similarity matrix $M_1$ in the buffer. When the similarity values of the similarity matrix $M_2$ corresponding to an offset are to be calculated, step 307 may comprise determining whether the similarity values of the coarse-resolution similarity matrix $M_1$ corresponding to the offset are stored in the buffer. If the similarity values of the coarse-resolution similarity matrix $M_1$ corresponding to the offset are stored in the buffer, step 307 may comprise reading the similarity values of the coarse-resolution similarity matrix $M_1$ corresponding to the offset from the buffer as the similarity values of the similarity matrix $M_2$ to be calculated.

In a further embodiment of method 300, for each l of the offsets of the coarse-resolution similarity matrix $M_1$, step 303 may comprise calculating the significant score sig(l) for evaluating the possibility of detecting the repetitive pattern corresponding to the offset l based on the calculated similarity values $s(t, l)$ of the coarse-resolution similarity matrix $M_1$ corresponding to the offset l. Step 303 may further comprise comparing the significant score sig(l) with a threshold TH(l) associated the offset l. If the significant score sig(l) is greater than the threshold TH(l), step 303 may further comprise determining the offset l as a significant offset.

If an offset l is determined as significant, step 307 may comprise calculating the similarity values of the similarity matrix $M_2$ corresponding to offsets falling within a range around the offset l. In other words, the significant offset and its neighboring offsets are included in the offsets to be detected. In this way, if an offset is not determined as significant or does not fall within such range, the offset is ignored in the detection.

Additionally or alternatively, in case that the coarse-resolution similarity matrix $M_1$ has the same resolution as the similarity matrix $M_2$ on the temporal axis, if an offset is determined as significant, step 303 may further comprise storing the similarity values corresponding to the offset in the buffer.

In a variant of these methods incorporating the significant offsets, the similarity matrices $M_1$ and $M_2$ may have the same resolution, including the high resolution. In this case, the adaptive threshold and the significant offsets are determined based on the similarity matrix $M_1$, and the repetitive pattern is detected based on the adaptive threshold and the significant offsets from the similarity matrix $M_2$.

In an example of calculating the significant score sig(l) for the similarity values corresponding to an offset l, it is possible to calculate the significant score as the maximal average in a moving window over the calculated similarity values of the similarity matrix corresponding to the offset l by Eq.(6). In this case, the calculated similarity values $s(t_i, l)$ are arranged as a row of a corresponding time-lag similarity matrix, that is, are arranged in order of minimal starting time $t_i$ of the frames $t_i$ and $t_i+l$ for calculating the similarity values $s(t_i, l)$.

In another example of calculating the significant score sig(l) for the similarity values corresponding to an offset l, it is possible to calculate an average of the calculated similarity values of the similarity matrix corresponding to the offset as the significant score sig(l).

The threshold TH(l) may be pre-defined, fixed, or adaptively calculated for each offset based on the similarity values. In case of adaptively calculating, step 303 may further comprise calculating the threshold TH(l) associated with the offset l as an average of the calculated significant scores corresponding to a predetermined number of the offsets around the offset. For example, the threshold TH(l) may be calculated by Eq.(7).

In some cases where online computing is required, only the significant score at one side may be available. In other words, the similarity values of the coarse-resolution similarity matrix are calculated in descending or ascending order of the offsets. In this case, step 303 may further comprise determining a threshold T'H(l) associated with the offset l as the maximum of a predetermined number Q of the previously calculated significant scores, e.g., sig(l−1), . . . , sig(l−Q) in case of the ascending order. If sig(l)>TH'(l), then the offset l is determined as significant. Alternatively, in this case, step 303 may further comprise determining the offset l as significant if sig(l)>TH(l) and sig(l)>TH'(l).

The above threshold-based constraints on significant offset may be combined with one or more of the following refinements.

Refinement 1—It is possible to refine the result based on a local peak criterion. In this case, step 303 may further comprise re-determining any significant offset having the significant score smaller than that of its neighboring offsets as non-significant.

Refinement 2—Step 303 may further comprise re-determining the offset within a predetermined range around any expected significant offset is as a significant offset. In other words, the offsets l, $l_{min} \leq l \leq l_{max}$ are determined as significant, where $l_{min}$ and $L_{max}$ is the lower bound and upper bound of the expected range around the significant offset ls.

Figure 4:
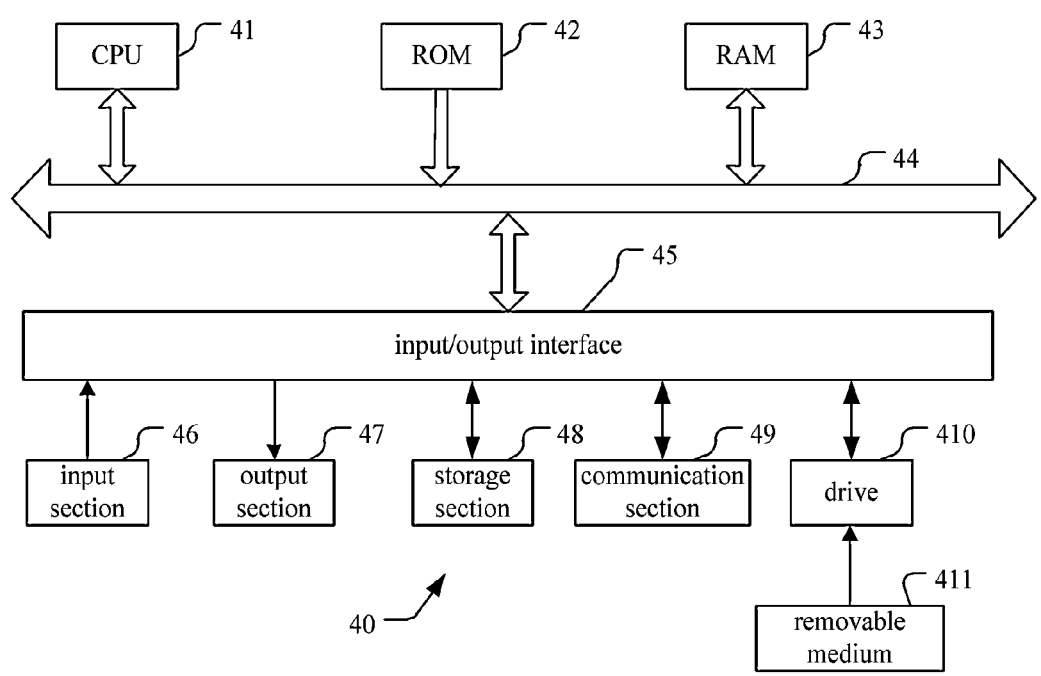
FIG. 4 is a block diagram illustrating an exemplary system for implementing aspects of the present invention.

FIG. 4 is a block diagram illustrating an exemplary system for implementing the aspects of the present invention.

In FIG. 4, a central processing unit (CPU) 401 performs various processes in accordance with a program stored in a read only memory (ROM) 402 or a program loaded from a storage section 408 to a random access memory (RAM) 403. In the RAM 403, data required when the CPU 401 performs the various processes or the like is also stored as required.

The CPU 401, the ROM 402 and the RAM 403 are connected to one another via a bus 404. An input 1 output interface 405 is also connected to the bus 404.

The following components are connected to the input/output interface 405: an input section 406 including a keyboard, a mouse, or the like; an output section 407 including a display such as a cathode ray tube (CRT), a liquid crystal display (LCD), or the like, and a loudspeaker or the like; the storage section 408 including a hard disk or the like; and a communication section 409 including a network interface card such as a LAN card, a modem, or the like. The communication section 409 performs a communication process via the network such as the internet.

A drive 410 is also connected to the input/output interface 405 as required. A removable medium 411, such as a magnetic disk, an optical disk, a magneto-optical disk, a semiconductor memory, or the like, is mounted on the drive 410 as required, so that a computer program read therefrom is installed into the storage section 408 as required.

In the case where the above-described steps and processes are implemented by the software, the program that constitutes the software is installed from the network such as the internet or the storage medium such as the removable medium 411.

The terminology used herein is for the purpose of describing particular embodiments only and is not intended to be limiting of the invention. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

The corresponding structures, materials, acts, and equivalents of all means or step plus function elements in the claims below are intended to include any structure, material, or act for performing the function in combination with other claimed elements as specifically claimed. The description of the present invention has been presented for purposes of illustration and description, but is not intended to be exhaustive or limited to the invention in the form disclosed. Many modifications and variations will be apparent to those of ordinary skill in the art without departing from the scope and spirit of the invention. The embodiment was chosen and described in order to best explain the principles of the invention and the practical application, and to enable others of ordinary skill in the art to understand the invention for various embodiments with various modifications as are suited to the particular use contemplated.

The following exemplary embodiments (each an "EE") are described.

EE 1. A method of detecting a repetitive pattern in a sequence of audio frames, comprising:
calculating similarity values of a first similarity matrix with first resolution for the sequence;
estimating an adaptive threshold from the similarity values for classifying the similarity values into repetition or non-repetition; and
for each of one or more offsets of a second similarity matrix with second resolution, the second resolution being higher than the first resolution,
calculating similarity values of the second similarity matrix corresponding to the offset;
classifying the calculated similarity values with the adaptive threshold to obtain binarized data; and
detecting the repetitive pattern from the binarized data.

EE 2. The method according to EE 1, wherein offsets of the first similarity matrix are not consecutive in units of frame.

EE 3. The method according to EE 2, wherein the offsets of the first similarity matrix are subsamples from a set $O=\{1, \ldots, L\}$, where L is the length of the sequence in units of frame.

EE 4. The method according to EE 2 or 3, wherein the offset axis of at least one of the first similarity matrix and the second similarity matrix has one-segment resolution, and the segment corresponding to the one-segment resolution includes a predetermined number of the audio frames, and
wherein for each of the similarity values $s_a(t, l)$, $l>0$ between two segments starting at audio frames t and t+l, the calculating comprises:
for each offset $l_i$ in the range from l−m to l+n, calculating a similarity value $s(t, l_i)$ between two segments starting at time t and $t+l_i$ respectively, m, n≥0 and m+n≠0, and
averaging the similarity values $s(t, l_i)$, $l-m \le l_i \le l+n$ as the similarity value $s_a(t, l)$.

EE 5. The method according to EE 1 or 2, wherein the temporal axis of at least one of the first similarity matrix and the second similarity matrix has one-segment resolution, and the segment corresponding to the one-segment resolution includes at least two audio frames.

EE 6. The method according to EE 5, wherein the similarity values of the at least one of the first similarity matrix and the second similarity matrix are calculated as similarity values between subsamples from frames of the segments.

EE 7. The method according to EE 6, wherein for each of the similarity values $s(t, l)$, $l>0$ of the at least one of the first similarity matrix and the second similarity matrix between two segments starting at audio frames t and t+l the calculating comprises:
for each pair of subsamples $t+t_i$ and $t+t_i+l$ of the two segments, calculating similarity values $s_h(t+t_i, l)$ between subsamples $t+t_i$ and $t+t_i+l$;
averaging the similarity values $s_h(t+t_i,l)$ as the similarity value $s(t, l)$.

EE 8. The method according to EE 5, wherein for each of the similarity values $s(t, l)$, $l>0$ of the at least one of the first similarity matrix and the second similarity matrix between two segments starting at audio frames t and t+l, the calculating comprises:
for each pair of audio frames t+i and t+i+l of the two segments, calculating similarity values $s_h(t+i, l)$ between audio frames t+i and t+i+l;
averaging the similarity values $s_h(t+i, l)$ as the similarity value $s(t, l)$.

EE 9. The method according to EE 1, wherein the calculating of the similarity values of the first similarity matrix comprises:

upon calculating each of the similarity values, updating statistics of the similarity values for estimating the adaptive threshold, and wherein the estimating comprises:

estimating the adaptive threshold based on the statistics.

EE 10. The method according to EE 9, wherein the statistics comprises a histogram for accumulating the number of the similarity values falling in each of similarity value bins.

EE 11. The method according to EE 1, wherein the first similarity matrix has the same resolution as the second similarity matrix on the temporal axis, further comprising:

storing the similarity values of the first similarity matrix corresponding to at least one portion of the offsets of the first similarity matrix in a buffer, and wherein the calculating of the similarity values of the second similarity matrix corresponding to the offset comprises:

determining whether the similarity values of the first similarity matrix corresponding to the same offset as the similarity values of the second similarity matrix to be calculated are stored in the buffer; and if the similarity values of the first similarity matrix corresponding to the same offset are stored in the buffer, reading the similarity values of the first similarity matrix corresponding to the same offset from the buffer as the similarity values of the second similarity matrix to be calculated.

EE 12. The method according to EE 11, wherein the calculating of the similarity values of the first similarity matrix comprises:

for each of the offsets of the first similarity matrix, calculating a significant score for evaluating the possibility of detecting the repetitive pattern corresponding to the offset based on the calculated similarity values of the first similarity matrix corresponding to the offset;

comparing the significant score with a threshold associated the offset; and if the significant score is greater than the threshold, determining the offset as a significant offset, and wherein the significant offset(s) is(are) included in the at least one portion of the offsets.

EE 13. The method according to EE 1, wherein the calculating of the similarity values of the first similarity matrix comprises:

for each of the offsets of the first similarity matrix, calculating a significant score for evaluating the possibility of detecting the repetitive pattern corresponding to the offset based on the calculated similarity values of the first similarity matrix corresponding to the offset;

comparing the significant score with a threshold associated the offset; and if the significant score is greater than the threshold, determining the offset as a significant offset, and wherein offsets of the second similarity matrix falling within a range around the significant offset(s) is(are) included in the one or more offsets.

EE 14. The method according to EE 12 or 13, wherein the significant score is calculated as the maximal average in a moving window over the calculated similarity values of the first similarity matrix corresponding to the offset, which are arranged in order of minimal time of the frames for calculating the calculated similarity values, or an average of the calculated similarity values of the first similarity matrix corresponding to the offset.

EE 15. The method according to EE 12 or 13, wherein the threshold associated with the offset is calculated as an average of the calculated significant scores corresponding to a predetermined number of the offsets around the offset.

EE 16. The method according to EE 12 or 13, wherein the similarity values of the first similarity matrix are calculated in descending or ascending order of the offsets, and the threshold associated with the offset is determined as the maximum of a predetermined number of the previously calculated significant scores.

EE 17. The method according to EE 12 or 13, wherein the similarity values of the first similarity matrix are calculated in descending or ascending order of the offsets, and another threshold associated with the offset is determined as the maximum of a predetermined number of the previously calculated significant scores, and wherein the comparing comprises comparing the significant score with the threshold associated the offset and comparing the significant score with the other threshold associated the offset, and wherein the determining comprises determining the offset as a significant offset if the significant score is greater than the threshold and the other threshold.

EE 18. The method according to one of claims 14 to 17, wherein the calculating of the similarity values of the first similarity matrix further comprises:

re-determining the significant offset(s) having the significant score(s) smaller than that of the neighboring offsets of the significant offset(s) as non-significant.

EE 19. The method according to EE one of claims 14 to 18, wherein the calculating of the similarity values of the first similarity matrix further comprises:

re-determining the offsets within a predetermined range around the significant offset(s) as significant offsets.

EE 20. An apparatus for detecting a repetitive pattern in a sequence of audio frames, comprising:

a calculator which calculates similarity values of a first similarity matrix with first resolution for the sequence;

an estimator which estimates an adaptive threshold from the similarity values for classifying the similarity values into repetition or non-repetition; and a detector which, for each of one or more offsets of a second similarity matrix with second resolution, the second resolution being higher than the first resolution, calculates similarity values of the second similarity matrix corresponding to the offset;

classifies the calculated similarity values with the adaptive threshold to obtain binarized data; and detects the repetitive pattern from the binarized data.

EE 21. The apparatus according to EE 20, wherein offsets of the first similarity matrix are not consecutive in units of frame.

EE 22. The apparatus according to EE 21, wherein the offsets of the first similarity matrix are subsamples from a set $O=\{1, \ldots, L\}$, where L is the length of the sequence in units of frame.

EE 23. The apparatus according to EE 22, wherein the offset axis of at least one of the first similarity matrix and the second similarity matrix has one-segment resolution, and the segment corresponding to the one-segment resolution includes a predetermined number of the audio frames, and wherein for each of the similarity values $s_a(t, 1)$, $l>0$ between two segments starting at audio frames t and t+l, the calculator is configured to for each offset $l_i$ in the range from l−m to l+n, calculate a similarity value $s(t, 1)$ between two segments starting at time t and t+$l_i$ respectively, m, n>0 and m+n≠0, and average the similarity values $s(t, 4)$, $l-m \le l_i \le l+n$ as the similarity value $s_a(t, 1)$.

EE 24. The apparatus according to EE 20 or 21, wherein the temporal axis of at least one of the first similarity matrix and the second similarity matrix has one-segment resolution, and the segment corresponding to the one-segment resolution includes at least two audio frames EE 25. The apparatus according to EE 24, wherein the similarity values of the at least one of the first similarity matrix and the second similarity matrix are calculated as similarity values between subsamples from frames of the segments EE 26. The apparatus according to EE 25 wherein for each of the similarity values s(t, l), l>0 of the at least one of the first similarity matrix and the second similarity matrix between two segments starting at audio frames t and t+l, the calculator is further configured to for each pair of subsamples t+$t_i$ and t+$t_i$+l of the two segments, calculate similarity values $s_h$(t+$t_i$, l) between subsamples t+$t_i$ and t+$t_i$+l;

average the similarity values $s_h$(t+$t_i$,l) as the similarity value s(t, l).

EE 27. The apparatus according to EE 24, wherein for each of the similarity values s(t, l), l>0 the at least one of the first similarity matrix and the second similarity matrix between two segments starting at audio frames t and t+l, the calculator is further configured to for each pair of audio frames t+i and t+i+l of the two segments, calculate similarity values $s_h$(t+i, l) between audio frames t+i and t+i+l;

average the similarity values $s_h$(t+i, l) as the similarity value s(t, l).

EE 28. The apparatus according to EE 20, wherein the calculator is configured to, upon calculating each of the similarity values, update statistics of the similarity values for estimating the adaptive threshold, and wherein the estimator is configured to estimate the adaptive threshold based on the statistics.

EE 29. The apparatus according to EE 28, wherein the statistics comprises a histogram for accumulating the number of the similarity values falling in each of similarity value bins.

EE 30. The apparatus according to EE 20, wherein the first similarity matrix has the same resolution as the second similarity matrix on the temporal axis, further comprising:

a buffer, and wherein the calculator is configured to store the similarity values of the first similarity matrix corresponding to at least one portion of the offsets of the first similarity matrix in the buffer, and wherein detector is configured to determine whether the similarity values of the first similarity matrix corresponding to the same offset as the similarity values of the second similarity matrix to be calculated are stored in the buffer; and if the similarity values of the first similarity matrix corresponding to the same offset are stored in the buffer, read the similarity values of the first similarity matrix corresponding to the same offset from the buffer as the similarity values of the second similarity matrix to be calculated.

EE 31. The apparatus according to EE 30, wherein the calculator is further configured to for each of the offsets of the first similarity matrix, calculate a significant score for evaluating the possibility of detecting the repetitive pattern corresponding to the offset based on the calculated similarity values of the first similarity matrix corresponding to the offset;

compare the significant score with a threshold associated the offset; and if the significant score is greater than the threshold, determine the offset as a significant offset, and wherein the significant offset(s) is(are) included in the at least one portion of the offsets.

EE 32. The apparatus according to EE 20, wherein the calculator is configured to for each of the offsets of the first similarity matrix, calculate a significant score for evaluating the possibility of detecting the repetitive pattern corresponding to the offset based on the calculated similarity values of the first similarity matrix corresponding to the offset;

compare the significant score with a threshold associated the offset; and if the significant score is greater than the threshold, determine the offset as a significant offset, and wherein offsets of the second similarity matrix falling within a range around the significant offset(s) is(are) included in the one or more offsets.

EE 33. The apparatus according to EE 31 or 32, wherein the significant score is calculated as the maximal average in a moving window over the calculated similarity values of the first similarity matrix corresponding to the offset, which are arranged in order of minimal time of the frames for calculating the calculated similarity values, or an average of the calculated similarity values of the first similarity matrix corresponding to the offset.

EE 34. The apparatus according to EE 31 or 32, wherein the calculator is further configured to calculate the threshold associated with the offset as an average of the calculated significant scores corresponding to a predetermined number of the offsets around the offset.

EE 35. The apparatus according to EE 31 or 32, wherein the similarity values of the first similarity matrix are calculated in descent or ascent order of the offsets, and the calculator is further configured to determine the threshold associated with the offset is determined as the maximum of a predetermined number of the previously calculated significant scores.

EE 36. The apparatus according to EE 31 or 32, wherein the similarity values of the first similarity matrix are calculated in descending or ascending order of the offsets, and another threshold associated with the offset is determined as the maximum of a predetermined number of the previously calculated significant scores, and wherein the calculator is further configured to compare the significant score with the threshold associated the offset and compare the significant score with the other threshold associated the offset, and determine the offset as a significant offset if the significant score is greater than the threshold and the other threshold.

EE 37. The apparatus according to one claims 33 to 36, wherein the calculator is further configured to re-determine the significant offset(s) having the significant score(s) smaller than that of the neighboring offsets of the significant offset(s) as non-significant.

EE 38. The apparatus according to EE 33 or 37, wherein the calculator is further configured to re-determine the offsets within a predetermined range around the significant offset (s) as significant offsets.

EE 39. A computer-readable medium having computer program instructions recorded thereon, when being executed by a processor, the instructions enabling the processor to perform a method of detecting a repetitive pattern in a sequence of audio frames comprising:

calculating similarity values of a first similarity matrix with first resolution for the sequence;

estimating an adaptive threshold from the similarity values for classifying the similarity values into repetition or non-repetition; and for each of one or more offsets of a second similarity matrix with second resolution, the second resolution being higher than the first resolution, calculating similarity values of the second similarity matrix corresponding to the offset;

classifying the calculated similarity values with the adaptive threshold to obtain binarized data; and detecting the repetitive pattern from the binarized data.

EE 40. A method of detecting a repetitive pattern in a sequence of audio frames, comprising:

calculating similarity values of a first similarity matrix for the sequence, comprising:

for each of the offsets of the first similarity matrix,
calculating a significant score for evaluating the possibility of detecting the repetitive pattern corresponding to the offset based on the calculated similarity values of the first similarity matrix corresponding to the offset;

comparing the significant score with a threshold associated the offset;

if the significant score is greater than the threshold, determining the offset as a significant offset; and storing the similarity values of the first similarity matrix corresponding to the significant offsets in a buffer;

estimating an adaptive threshold from the similarity values for classifying the similarity values into repetition or non-repetition;

for a second similarity matrix with the same resolution as the first similarity matrix, reading the similarity values of the first similarity matrix corresponding to the significant offsets from the buffer as the similarity values of the second similarity matrix;

classifying the read similarity values with the adaptive threshold to obtain binarized data; and detecting the repetitive pattern from the binarized data.

EE 41. An apparatus for detecting a repetitive pattern in a sequence of audio frames, comprising:

a calculator which calculates similarity values of a first similarity matrix for the sequence, where for each of the offsets of the first similarity matrix, the calculator calculates a significant score for evaluating the possibility of detecting the repetitive pattern corresponding to the offset based on the calculated similarity values of the first similarity matrix corresponding to the offset;

compares the significant score with a threshold associated the offset; and if the significant score is greater than the threshold, determines the offset as a significant offset, and stores the similarity values of the first similarity matrix corresponding to the significant offsets in a buffer;

an estimator which estimates an adaptive threshold from the similarity values for classifying the similarity values into repetition or non-repetition; and a detector which, for a second similarity matrix with the same resolution as the first similarity matrix, reads the similarity values of the first similarity matrix corresponding to the significant offsets from the buffer as the similarity values of the second similarity matrix;

classifies the read similarity values with the adaptive threshold to obtain binarized data; and detects the repetitive pattern from the binarized data.

We claim:

1. A method of detecting a repetitive pattern, the method comprising:

receiving, by an apparatus including an embedded system having a processor and a memory, a sequence of audio frames;

calculating, by the processor, similarity values of a first similarity matrix for the sequence, comprising:

for each of a plurality of offsets of the first similarity matrix, calculating a significant score for evaluating the possibility of detecting the repetitive pattern corresponding to the offset based on the calculated similarity values of the first similarity matrix corresponding to the offset;

comparing the significant score with a threshold associated with the offset;

if the significant score is greater than the threshold, determining the offset as a significant offset; and storing the similarity values of the first similarity matrix corresponding to the significant offsets in a buffer;

estimating, by the processor, an adaptive threshold from the similarity values for classifying the similarity values into repetition or non-repetition;

for a second similarity matrix with the same resolution as the first similarity matrix, wherein the second similarity matrix includes more than one offset, reading the similarity values of the first similarity matrix corresponding to the significant offsets from the buffer as the similarity values of the second similarity matrix;

classifying the read similarity values with the adaptive threshold to obtain binarized data; and detecting the repetitive pattern from the binarized data, wherein detecting the repetitive pattern detects a music chorus in the sequence of audio frames, wherein the processor calculates the significant score sig(l) according to an equation:

$$sig(l) = \max_t \frac{1}{W} \sum_{i=1}^{W} s(t+i, l)$$

wherein l is the offset and W is a window length, and wherein the processor calculates the threshold Th(l) associated with the offset according to an equation:

$$Th(l) = \sum_{t=l-k_1}^{l+k_2} w(t) sig(t)$$

wherein l is the offset, w(t) is a weighting function set to $1/(k_1+k_2+1)$, sig(t) is the significant score, $0 \le k_1 \le 1$, $0 \le k_2$, and $k_1+k_2 \ne 0$.

2. The method of claim 1, wherein the processor calculates the similarity values of the first similarity matrix as $$s(t, l) = \sum_{i=0}^{W-1} w(i) s_h(t+i, l)$$

wherein $s_h(t+i, l)$ are the similarity values between audio frames t+i of the segment t and audio frames t+l+i of the segment t+l, and w(i) is a weighting factor.

3. The method of claim 1, wherein the processor calculates the similarity values of the first similarity matrix as $$s(t, l) = \sum_{i=0}^{N-1} w(i) s_h(t_i, l)$$

wherein $s_h(t_i, l)$ are the similarity values between audio frames $t_i$ of the segment t and audio frames $t_i+l$ of the segment t+l, and w(i) is a weighting factor.

4. The method of claim 1, wherein the processor calculates the similarity values of the first similarity matrix as $$s_a(t, l_i) = \sum_{i=0}^{m+n-1} w(i) s(t, t_j)$$

wherein $s(t, t_j)$ are the similarity values between two segments t and t+$t_j$, $t_j$ represents each offset in a range from $l_i$–m to $l_i$+n, and w(i) is a weighting factor.

5. The method of claim 1, wherein the threshold is adaptively calculated for the offset based on the similarity values.

6. The method of claim 1, wherein the threshold is adaptively calculated for the offset as an average of the calculated significant scores corresponding to a predetermined number of the offsets around the offset.

7. The method of claim 1, further comprising:
re-determining, by the processor, a significant offset as a non-significant offset.

8. The method of claim 1, further comprising:
re-determining, by the processor, a given significant offset as a non-significant offset when the significant score of the given significant offset is smaller than a first offset and a second offset that neighbor the given significant offset.

9. The method of claim 1, wherein offsets of the second similarity matrix falling within a predefined range around the significant offset(s) is(are) included in the more than one offset.

10. The method of claim 1, wherein the window length W sets a minimum length of repetition of the music chorus to be detected.

11. An apparatus for detecting a repetitive pattern, the apparatus comprising:
an embedded system having a processor and a memory, wherein the processor is configured to control the apparatus to execute processing comprising:

receiving a sequence of audio frames;
calculating, by the processor, similarity values of a first similarity matrix for the sequence, comprising:
for each of a plurality of offsets of the first similarity matrix, calculating a significant score for evaluating the possibility of detecting the repetitive pattern corresponding to the offset based on the calculated similarity values of the first similarity matrix corresponding to the offset;
comparing the significant score with a threshold associated with the offset;
if the significant score is greater than the threshold, determining the offset as a significant offset; and
storing the similarity values of the first similarity matrix corresponding to the significant offsets in a buffer;
estimating, by the processor, an adaptive threshold from the similarity values for classifying the similarity values into repetition or non-repetition;
for a second similarity matrix with the same resolution as the first similarity matrix,
reading the similarity values of the first similarity matrix corresponding to the significant offsets from the buffer as the similarity values of the second similarity matrix;
classifying the read similarity values with the adaptive threshold to obtain binarized data; and
detecting the repetitive pattern from the binarized data, wherein detecting the repetitive pattern detects a music chorus in the sequence of audio frames,
wherein the processor calculates the significant score sig(l) according to an equation:

$$sig(l) = \max_t \frac{1}{W} \sum_{i=1}^{W} s(t+i, l)$$

wherein l is the offset and W is a window length, and
wherein the processor calculates the threshold Th(l) associated with the offset according to an equation:

$$Th(l) = \sum_{t=l-k_1}^{l+k_2} w(t) sig(t)$$

wherein l is the offset, w(t) is a weighting function set to $1/(k_1+k_2+1)$, sig(t) is the significant score, $0 \le k_1 \le 1$, $0 \le k_2$, and $k_1+k_2 \ne 0$.

* * * * *